T. A. EDISON.
PROCESS AND APPARATUS FOR ARTIFICIALLY AGING OR SEASONING PORTLAND CEMENT.
APPLICATION FILED APR. 2, 1907.
941,630.
Patented Nov. 30, 1909.
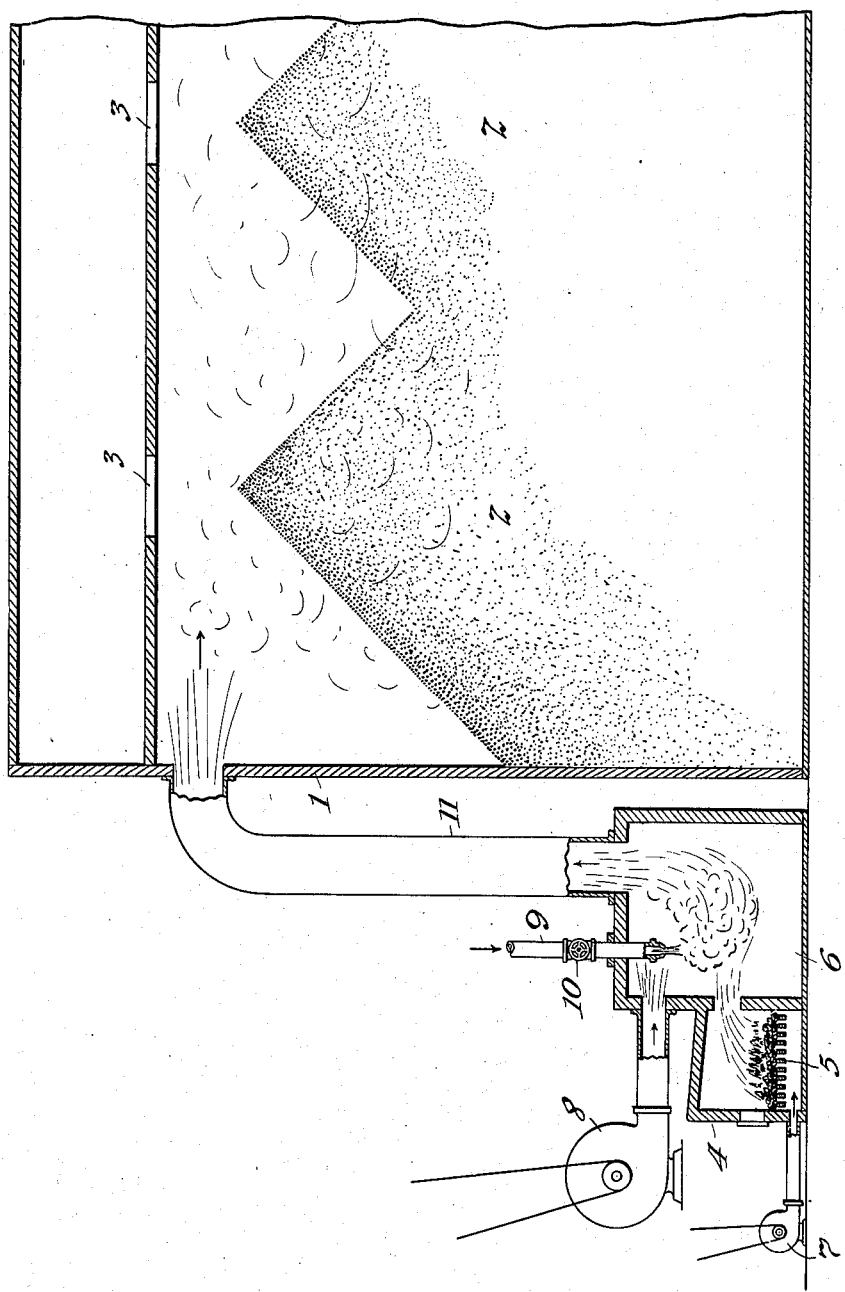

UNITED STATES PATENT OFFICE.

THOMAS A. EDISON, OF LLEWELLYN PARK, ORANGE, NEW JERSEY, ASSIGNOR TO EDISON PORTLAND CEMENT COMPANY, OF STEWARTSVILLE, NEW JERSEY, A CORPORATION OF NEW JERSEY.

PROCESS AND APPARATUS FOR ARTIFICIALLY AGING OR SEASONING PORTLAND CEMENT.

941,630.  Specification of Letters Patent.  Patented Nov. 30, 1909.

Application filed April 2, 1907. Serial No. 365,908.

*To all whom it may concern:*

Be it known that I, THOMAS ALVA EDISON, a citizen of the United States, and a resident of Llewellyn Park, Orange, in the county of Essex and State of New Jersey, have invented certain new and useful Improvements in Processes and Apparatus for Artificially Aging or Seasoning Portland Cement, of which the following is a description.

Under the present practice, in the manufacture of Portland cement, in which rotary kilns are used, the freshly ground material is stored in a suitable stock house and is permitted to age or season until it is in condition to be used in construction work or to be submitted to the ordinary tests. Obviously the absorption of atmospheric moisture is a very slow operation, depending entirely upon the temperature and hygroscopic conditions of the air, so that not only is the operation tedious but the quality of the material is likely to vary within considerable limits.

The object of my invention is to provide a process and apparatus by which this treatment may be performed artificially so that the seasoning or aging of the cement may be so rapidly effected that the material may be used or tested within a few hours after the grinding. At the same time, the operations are under such exact control that the quality may be regulated within very close limits. The improved treatment is carried on absolutely independent of the weather conditions, so that those factors do not have to be considered in carrying the invention into effect.

In order that the invention may be better understood, attention is directed to the accompanying drawing, showing a longitudinal sectional view of a conventional form of stock house equipped with suitable apparatus for carrying the process into effect.

It may be stated broadly that the invention consists in creating within a stock house or other receptacle containing the cement to be seasoned or aged, an artificial atmosphere greatly exaggerated as to temperature and moisture, so that the seasoning operations which under present conditions may require many days, can be effected in a few hours. At the same time, the factors which determine the temperature and moisture of the artificially created atmosphere are always under perfect control, so that the quality of the resulting material may be regulated within close limits.

In the stock house 1, I illustrate two piles of cement 2—2, introduced within the stock house in any suitable way, as for example through openings 3—3. At the side of the stock house is a furnace 4 having a grate 5 upon which fuel is burned, and connecting with the mixing chamber 6. The fuel on the grate 5 is preferably burned under a forced draft furnished by a fan 7, operated by a regulable motor. A large fan 8 supplies atmospheric air to the mixing chamber so as to dilute and reduce the temperature of the products of combustion from the furnace 4, any suitable means being provided for regulating the amount of air furnished by the fan 8, as for example, by regulating the speed of the motor which drives the same. Leading into the mixing chamber 6 is a steam pipe 9, provided with a valve 10, and by means of which a regulable supply of steam may be permitted to enter the mixing chamber to more perfectly admix the gaseous products therein and also to furnish the desired amount of moisture to the artificial atmosphere. A pipe 11 leads from the mixing chamber 6 into the stock house 1, so as to direct the artificially created atmosphere within the stock house to rapidly act upon the cement therein. The pressure within the stock house will ordinarily be relieved by the usual openings in the walls or roof thereof, as for example, the openings 3; but, if desired, specially formed vents may be provided for this purpose.

In operation the two fans 7 and 8 will be so regulated as to supply to the stock house an artificial atmosphere of relatively high temperature, preferably between 125° F. and 150° F. and to which may be added sufficient moisture, due to the presence of the steam, as to effect the aging or seasoning of the cement in the most effective manner, the degree of moisture being preferably in the neighborhood of saturation.

I find in practice that by aging or seasoning cement as I have described, it becomes possible to make use of a smaller amount of gypsum to control its setting properties, than when the cement is aged in the usual manner, and the necessity of burning the cement very hard is diminished, thereby resulting in greater output and economy of coal.

Having now described my invention, what I claim as new and desire to secure by Letters Patent, is as follows:

1. The process of artificially aging or seasoning Portland cement which consists in mixing atmospheric air, water vapor and products of combustion, and subjecting a body of the cement to the action of the hot mixture, substantially as set forth.

2. The process of artificially aging or seasoning Portland cement which consists in subjecting a body of cement to the action of heated air substantially saturated with water vapor the temperature of which is in excess of 100° F., substantially as set forth.

3. The process of artificially aging or seasoning Portland cement which consists in subjecting a body of cement to the action of heated gases comprising a mixture of atmospheric air, water vapor and products of combustion, the temperature of which is in excess of 100° F.

4. Apparatus for aging or seasoning cement, comprising in combination a suitable stock house or receptacle in which cement is stored, a mixing chamber, connections between the mixing chamber and the stock house and means for directing into the mixing chamber separate currents of atmospheric air and hot products of combustion, substantially as set forth.

5. Apparatus for aging or seasoning cement, comprising in combination a suitable stock house or receptacle in which the cement is stored, a mixing chamber, connections between the mixing chamber and the stock house, means for directing into the mixing chamber separate currents of atmospheric air and hot products of combustion, and means for regulating said currents, substantially as set forth.

6. Apparatus for aging or seasoning cement, comprising in combination a suitable stock house or receptacle in which the cement is stored, a mixing chamber, connections between the mixing chamber and the stock house, means for directing into the mixing chamber separate currents of atmospheric air and hot products of combustion, and a steam pipe leading into the mixing chamber, substantially as set forth.

7. Apparatus for aging or seasoning cement, comprising in combination a suitable stock house or receptacle in which the cement is stored, a mixing chamber, connections between the mixing chamber and the stock house, means for directing into the mixing chamber separate currents of atmospheric air and hot products of combustion, a steam pipe leading into the mixing chamber, said steam pipe being arranged perpendicular to the paths of the current and combustion products, so as to effect a mixture of the same, substantially as set forth.

This specification signed and witnessed this 25th day of February 1907.

THOMAS A. EDISON.

Witnesses:
FRANK L. DYER,
ANNA R. KLEHM.